United States Patent
Yang et al.

(10) Patent No.: US 11,673,604 B2
(45) Date of Patent: *Jun. 13, 2023

(54) TORQUE SENSOR

(71) Applicant: LG INNOTEK CO., LTD., Seoul (KR)

(72) Inventors: Jong Yeop Yang, Seoul (KR); Ho Chan Son, Seoul (KR); Ye Won Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 322 days.

This patent is subject to a terminal disclaimer.

(21) Appl. No.: 17/030,629

(22) Filed: Sep. 24, 2020

(65) Prior Publication Data

US 2021/0016828 A1 Jan. 21, 2021

Related U.S. Application Data

(63) Continuation of application No. 16/474,509, filed as application No. PCT/KR2017/015532 on Dec. 27, 2017, now Pat. No. 10,814,909.

(30) Foreign Application Priority Data

Dec. 28, 2016 (KR) .......................... 10-2016-0181102
Jan. 25, 2017 (KR) .......................... 10-2017-0012013
Jan. 26, 2017 (KR) .......................... 10-2017-0012771

(51) Int. Cl.
*B62D 6/10* (2006.01)
*G01B 7/06* (2006.01)
(Continued)

(52) U.S. Cl.
CPC ................. *B62D 6/10* (2013.01); *G01B 7/06* (2013.01); *G01D 5/12* (2013.01); *G01L 3/101* (2013.01);
(Continued)

(58) Field of Classification Search
CPC ......... G01L 3/102; G01L 3/104; G01L 3/105; G01L 3/02; G01L 3/04; G01L 3/10;
(Continued)

(56) References Cited

U.S. PATENT DOCUMENTS 7,363,825 B2  4/2008  Feng et al.
8,390,276 B2  3/2013  McDonald et al.
(Continued)

FOREIGN PATENT DOCUMENTS

CN    2294534 Y    10/1998
EP    2433848 A2    3/2012
(Continued)

*Primary Examiner* — Jonathan M Dunlap
(74) *Attorney, Agent, or Firm* — Birch, Stewart, Kolasch & Birch, LLP

(57) ABSTRACT

The present invention may provide a torque sensor comprising, a rotor, a stator disposed outside the rotor; a sensor assembly configured to measure a magnetic field generated between the rotor and the stator; and a housing, the rotor and the stator are disposed outside the housing, the sensor assembly is disposed inside the housing, wherein the housing includes a protrusion which faces the stator, wherein the stator includes a groove, wherein the protrusion is disposed in the groove.

12 Claims, 18 Drawing Sheets

(51) Int. Cl.
*G01D 5/12* (2006.01)
*G01L 3/10* (2006.01)
*G01L 5/22* (2006.01)
*G01L 3/04* (2006.01)
*G01L 3/02* (2006.01)

(52) U.S. Cl.
CPC ............... *G01L 5/221* (2013.01); *G01L 3/02* (2013.01); *G01L 3/04* (2013.01); *G01L 3/10* (2013.01); *G01L 3/102* (2013.01); *G01L 3/104* (2013.01); *G01L 3/105* (2013.01)

(58) Field of Classification Search
CPC ........... G01L 3/101; G01L 5/221; G01B 7/06; B62D 6/10; G01D 5/12
See application file for complete search history.

(56) References Cited

U.S. PATENT DOCUMENTS

| | | | |
|---|---|---|---|
| 8,448,528 | B2 | 5/2013 | McDonald et al. |
| 8,939,038 | B2 | 1/2015 | Woo |
| 9,459,165 | B2 | 10/2016 | Hama et al. |
| 10,180,366 | B2 | 1/2019 | Yoneda et al. |
| 2012/0073386 | A1 | 3/2012 | McDonald et al. |
| 2013/0133437 | A1 | 5/2013 | Woo |
| 2015/0276519 | A1 | 10/2015 | Hama et al. |

FOREIGN PATENT DOCUMENTS

| | | |
|---|---|---|
| JP | 2015-190816 A | 11/2015 |
| JP | 2016-206091 A | 12/2016 |
| KR | 10-1098117 B1 | 12/2011 |
| KR | 10-2012-0031848 A | 4/2012 |
| KR | 10-2013-0059565 A | 6/2013 |
| KR | 10-2015-0082919 A | 7/2015 |

[FIG. 1]
10
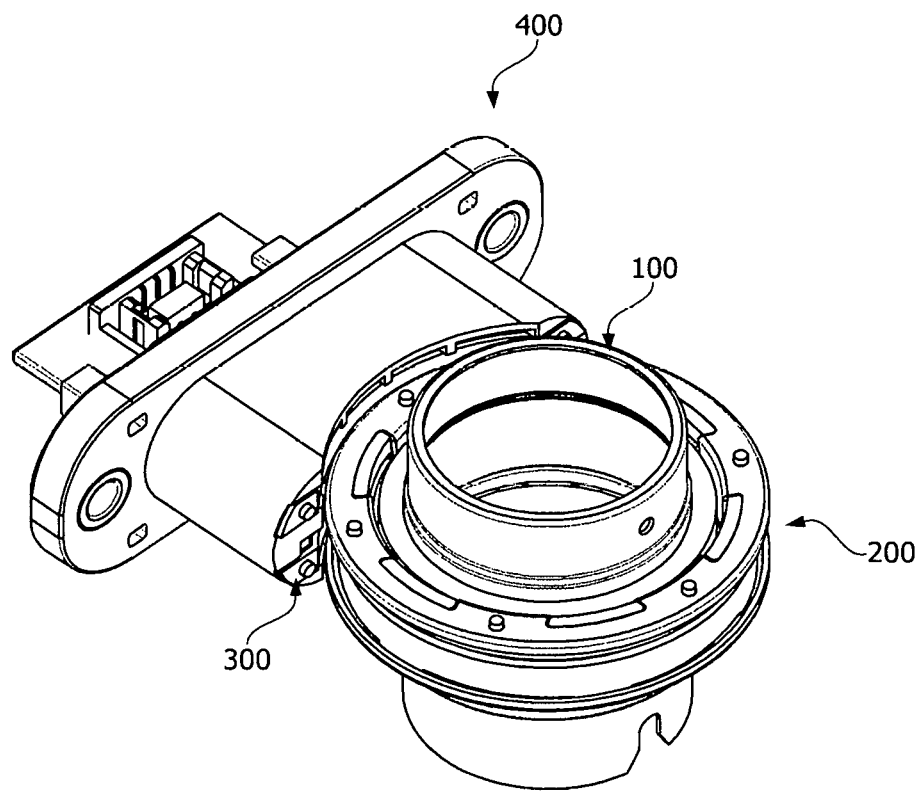

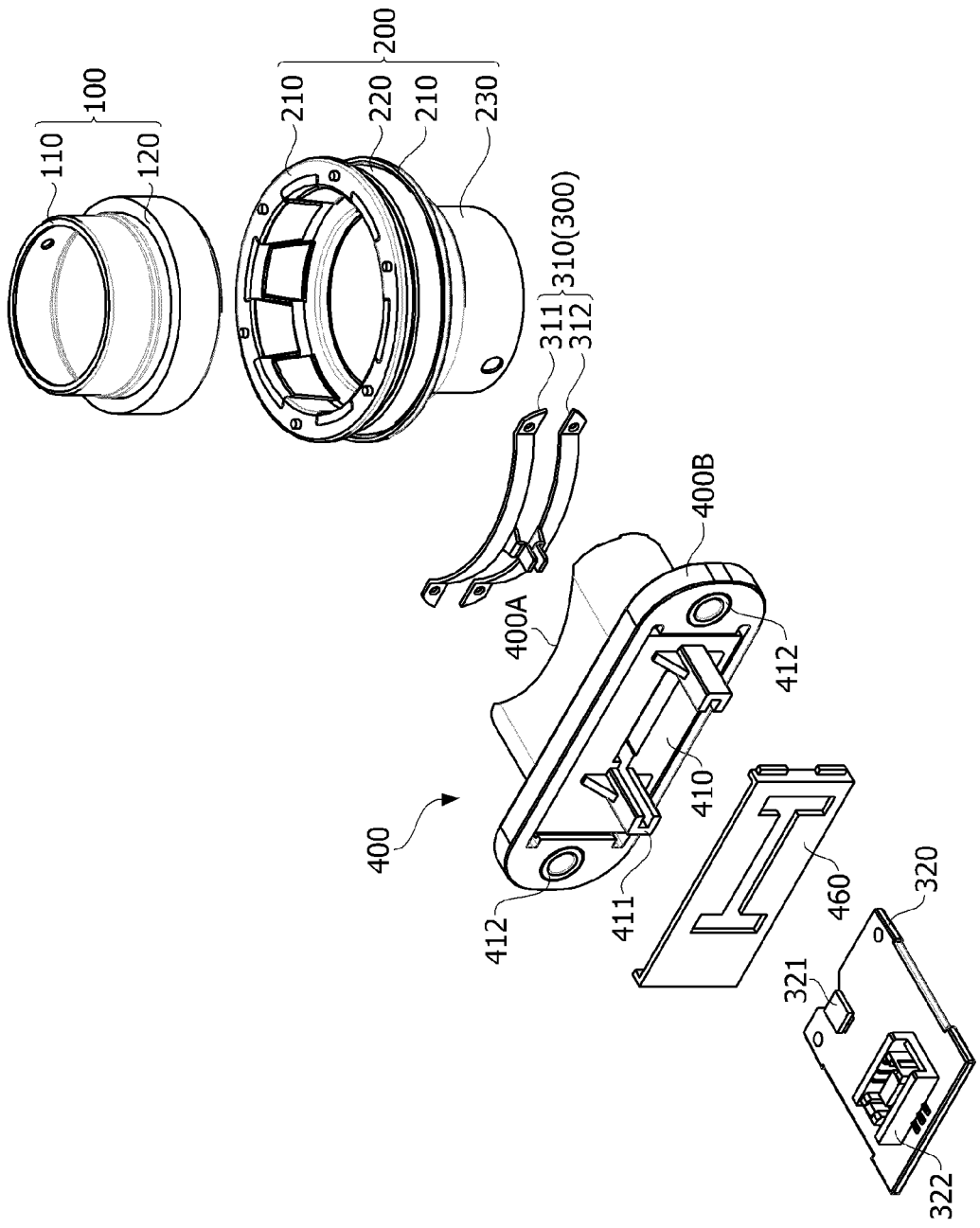
[FIG. 2]

[FIG. 3]
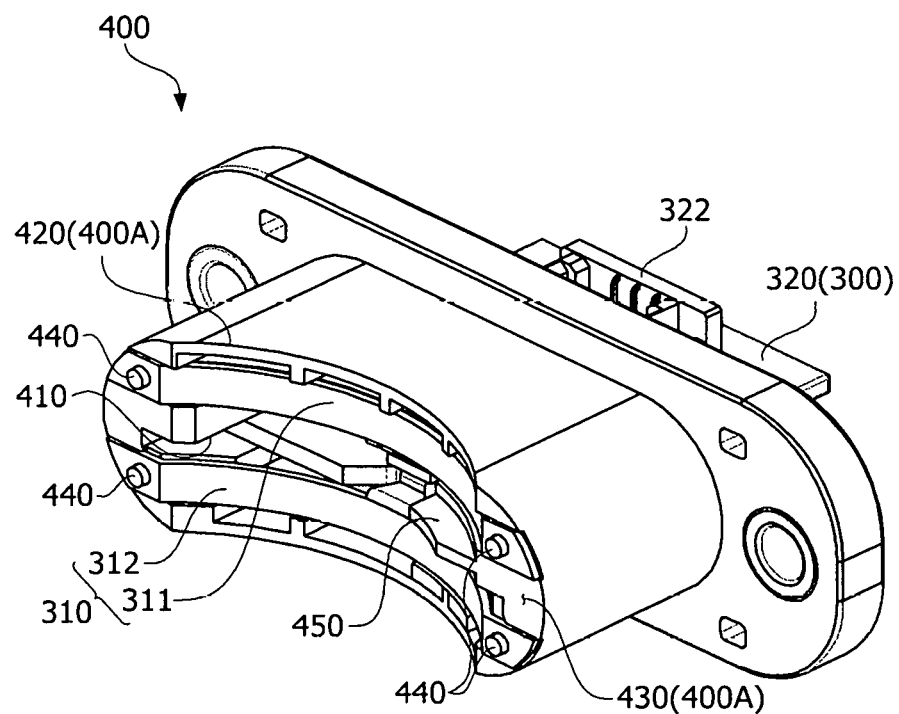

[FIG. 4]
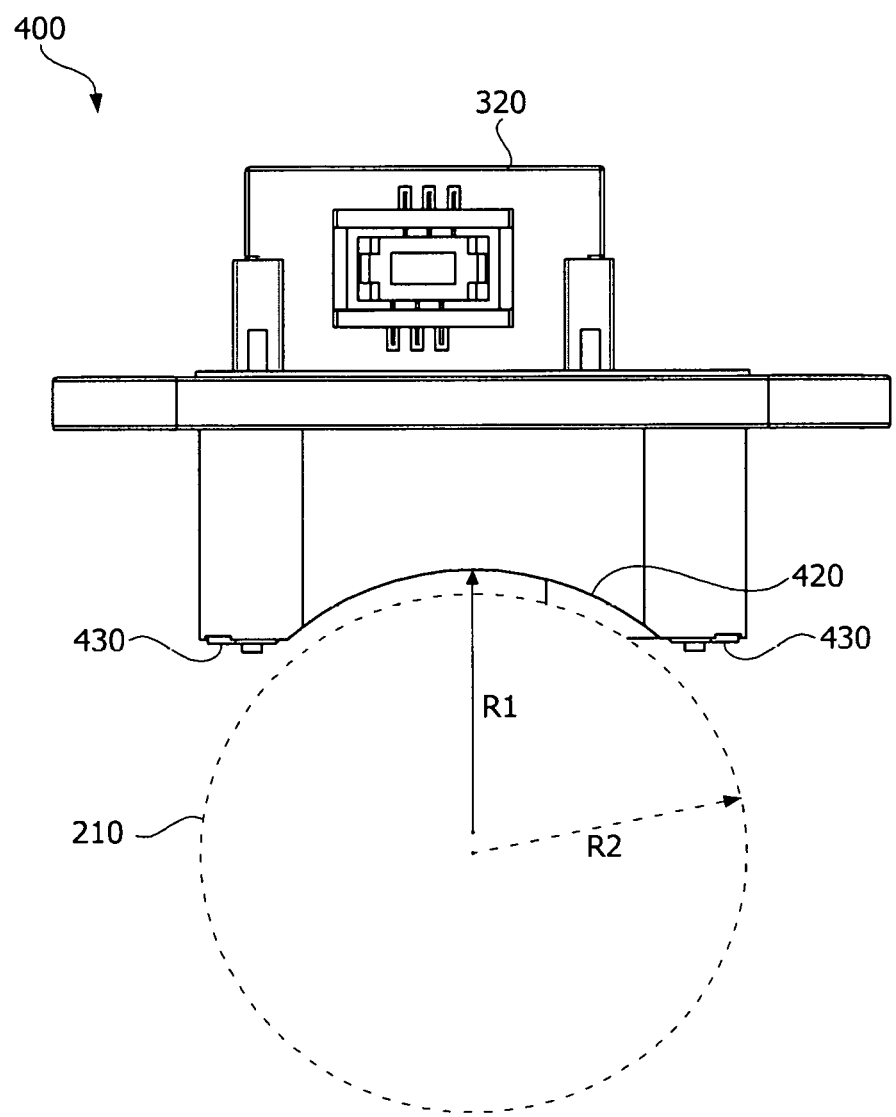

[FIG. 5]
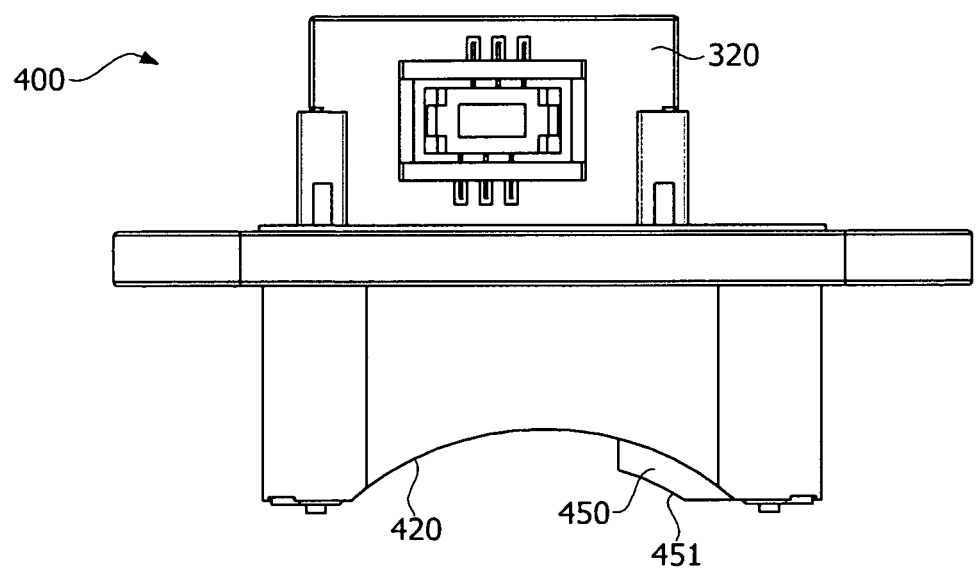

[FIG. 6]
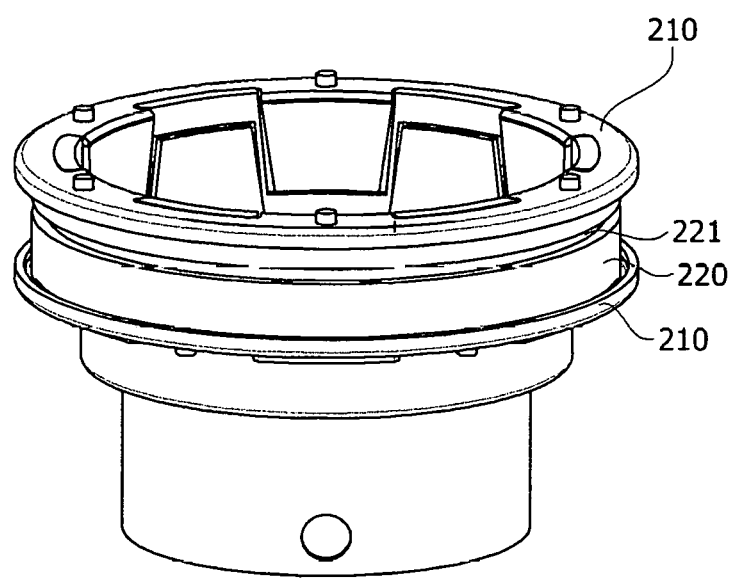

[FIG. 7]
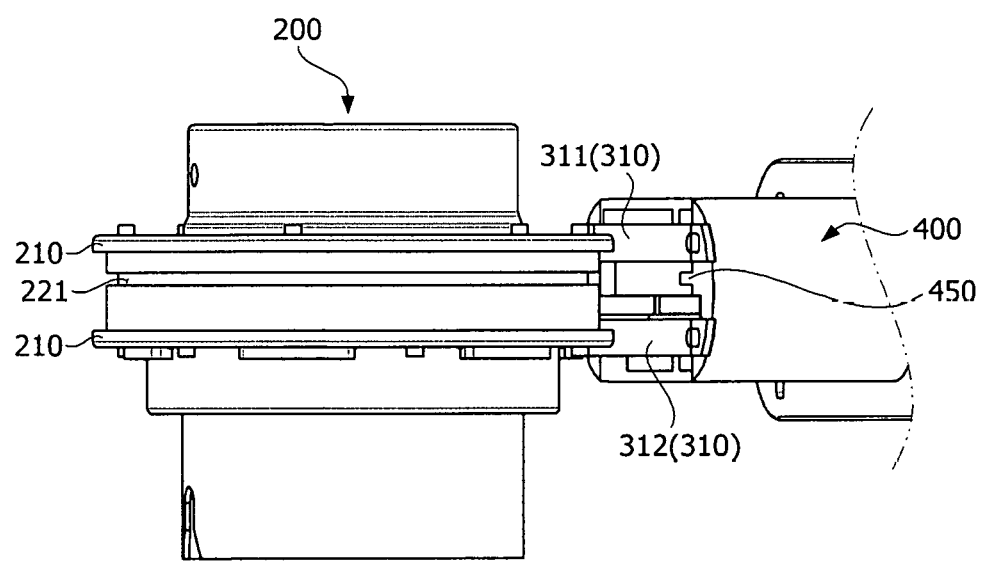

[FIG. 8]
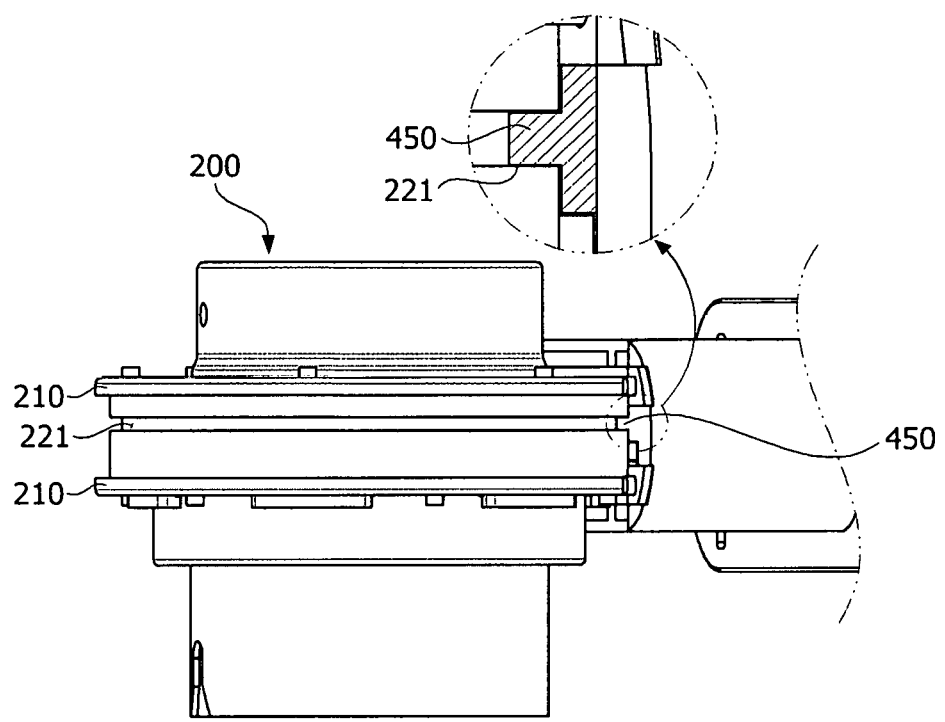

[FIG. 9]
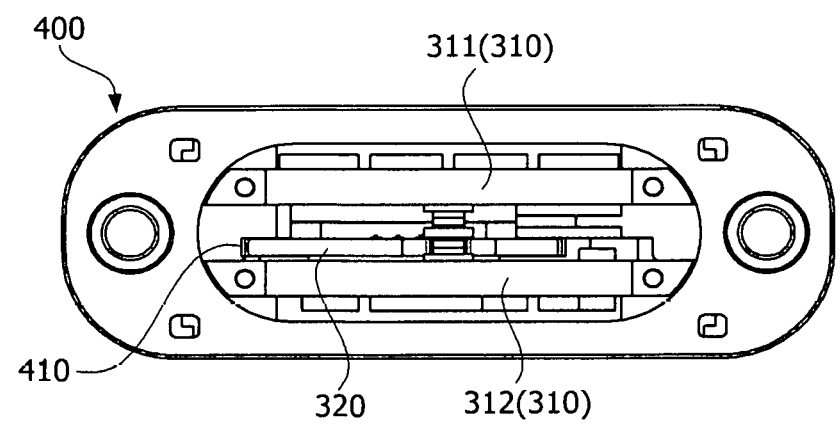

[FIG. 10]
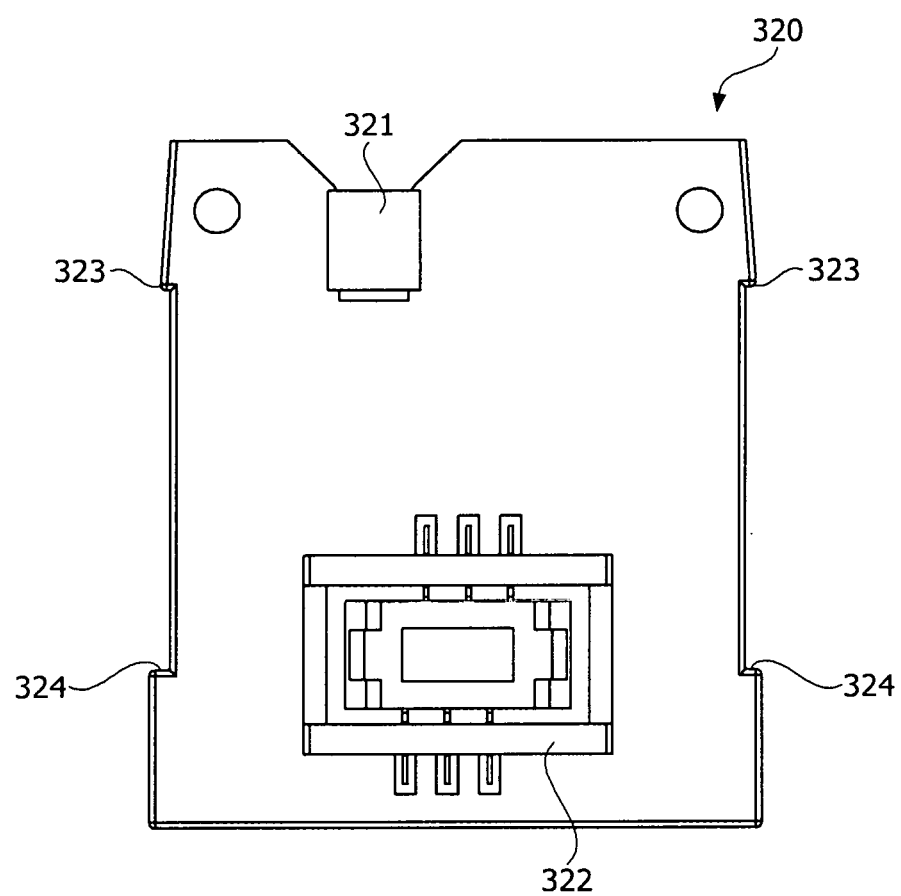

[FIG. 11]
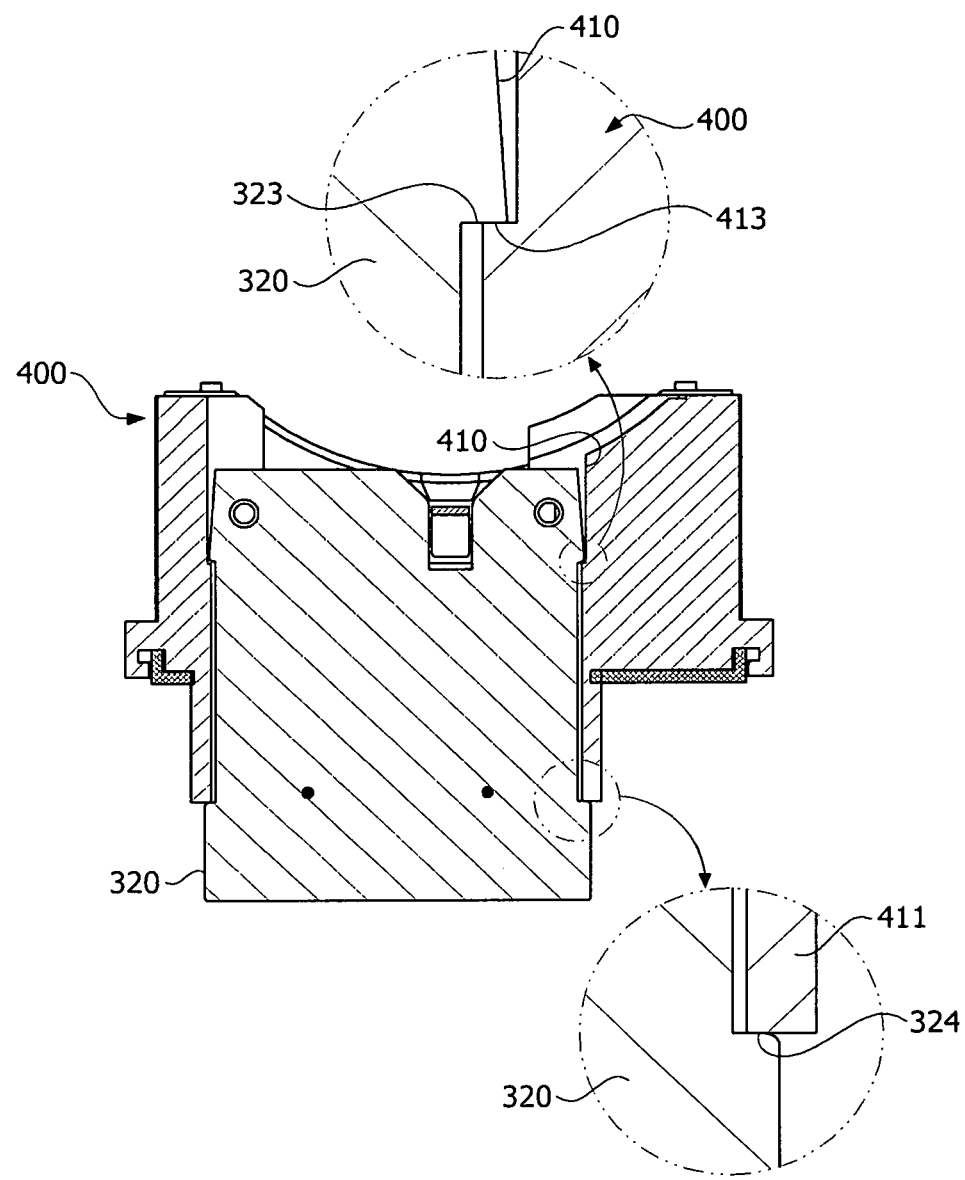

[FIG. 12]
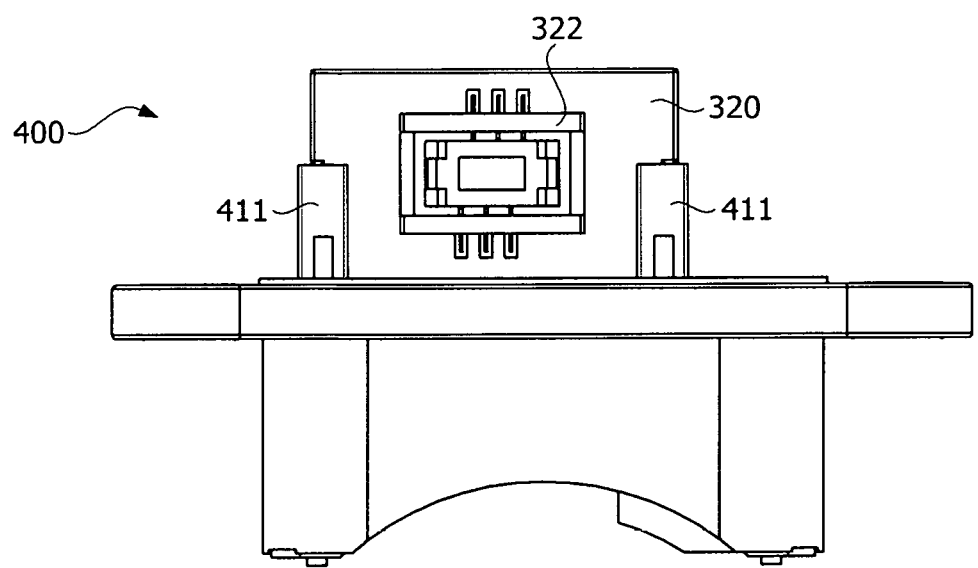

[FIG. 13]
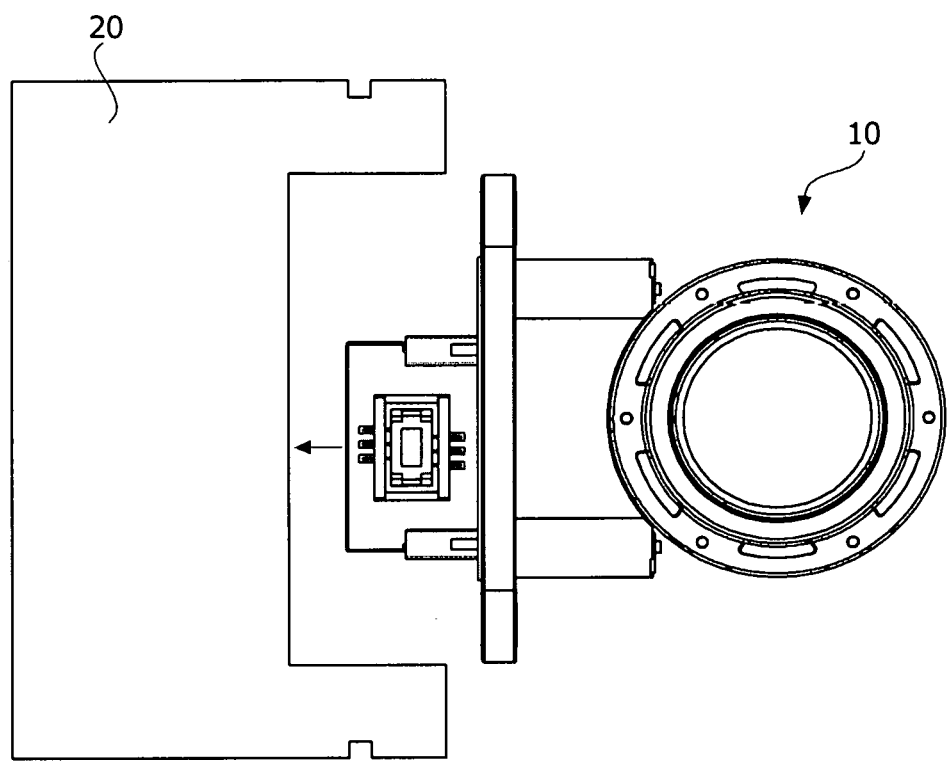

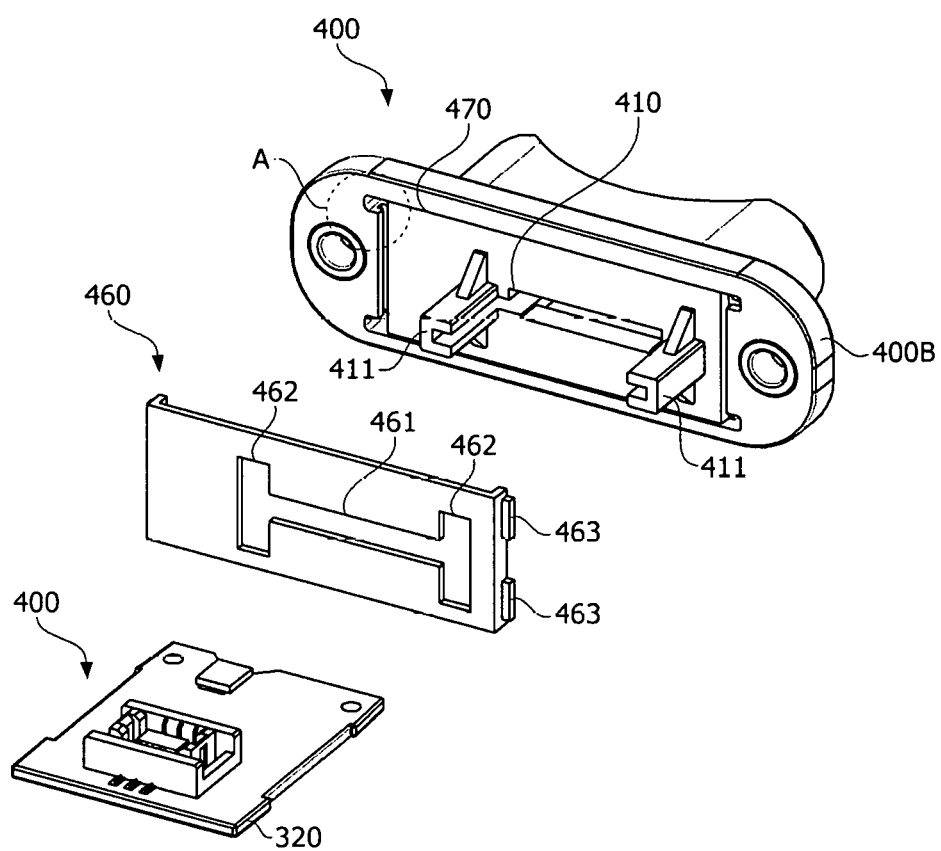
[FIG. 14]

[FIG. 15]
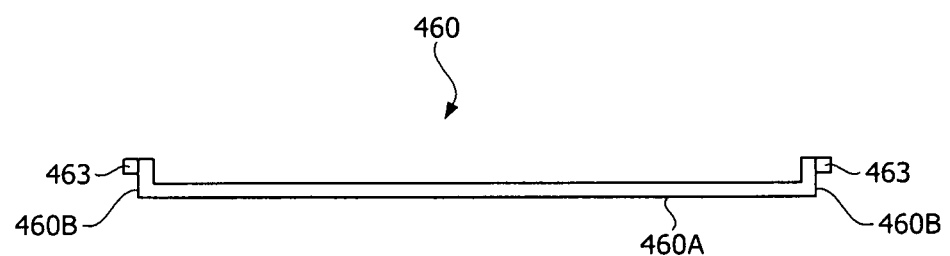

[FIG. 16]
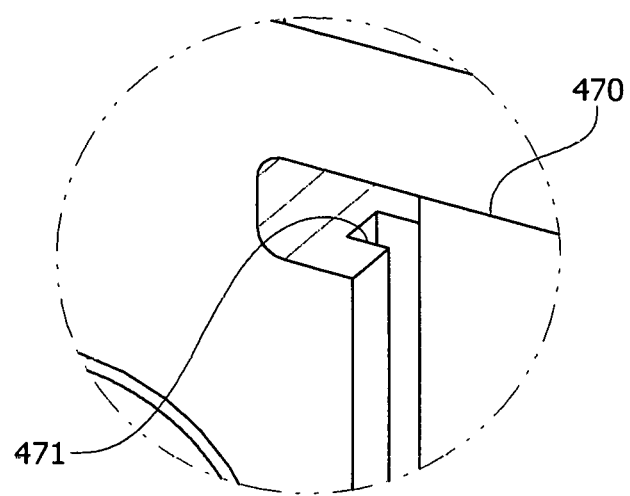

[FIG. 17]
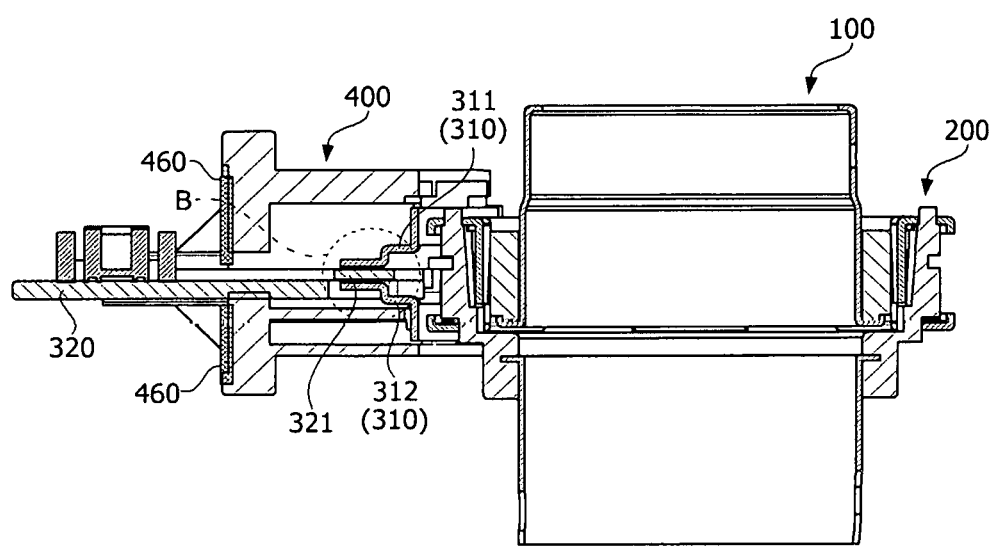

[FIG. 18]
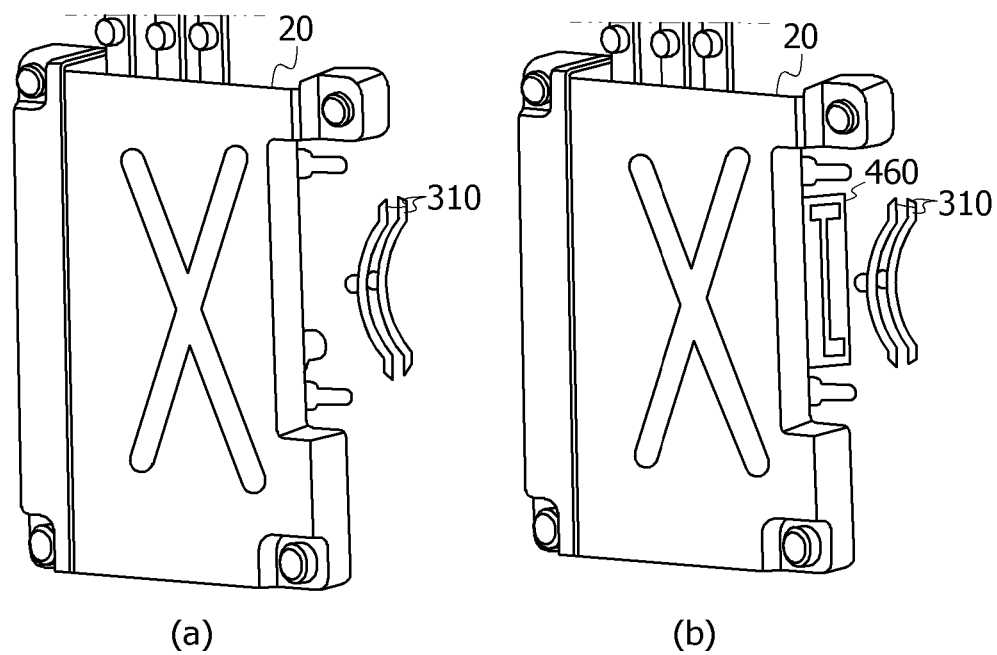
(a)  (b)

TORQUE SENSOR

CROSS REFERENCE TO RELATED APPLICATIONS

This application is a Continuation of U.S. application Ser. No. 16/474,509 filed on Jun. 27, 2019, which is the National Phase of PCT International Application No. PCT/KR2017/015532, filed on Dec. 27, 2017, which claims priority under 35 U.S.C. 119(a) to Patent Application Nos. 10-2016-0181102, filed in the Republic of Korea on Dec. 28, 2016; 10-2017-0012013, filed in the Republic of Korea on Jan. 25, 2017 and 10-2017-0012771, filed in the Republic of Korea on Jan. 26, 2017, all of which are hereby expressly incorporated by reference into the present application.

TECHNICAL FIELD

The present invention relates to a torque sensor.

BACKGROUND ART

An electronic power system (EPS) drives a motor using an electronic control unit (ECU) according to traveling conditions to ensure turning stability and rapidly provide a restoring force so that a driver can travel stably.

In order to provide a proper torque, the EPS includes a torque sensor configured to measure torque of a steering shaft. The steering shaft may include an input shaft connected to a handle, an output shaft connected to a power transmission system of a side of a wheel, and a torsion bar which connects the input shaft to the output shaft.

The torque sensor measures torque applied to the steering shaft by measuring the degree of torsion of the torsion bar. Such a torque sensor may include a rotor, a stator, and a sensor assembly. The sensor assembly may include a collector configured to measure an amount of magnetization of the stator.

Meanwhile, there is a compact torque sensor in which a sensor assembly and a stator are individually formed. However, since the sensor assembly and the stator of the torque sensor are individually formed, there are problems in that an error in alignment position occurs between the stator and the collector, and torque may not be measured accurately.

In addition, the sensor assembly is included in a separate housing. The housing includes a collector configured to collect a magnetic field of the stator. Here, a substrate of the sensor assembly is fixed to the housing. When a gap is formed between the substrate and the collector, since a signal becomes inaccurate, the substrate and the housing should be fixed using a separate member.

However, a configuration, in which the housing and the substrate are fixed using a screw or the substrate and the housing are fixed by thermosetting, has a problem in that manufacturing processes and manufacturing costs are increased.

In addition, the sensor assembly may be connected to an ECU. Here, a high current of the ECU may negatively affect performance of the sensor assembly. Accordingly, in order to avoid the high current of the ECU, the sensor assembly and the ECU of a vehicle are spaced apart from each other and connected to each other through a wire harness. However, such a configuration has a problem in that the size of a product is increased.

DISCLOSURE

Technical Problem

The present invention is directed to providing a torque sensor, in which a sensor assembly and a stator are individually formed, capable of securing an alignment position between the stator and a collector, and a steering apparatus including the same.

In addition, the present invention is directed to providing a torque sensor, in which a substrate is fixed to a slot without a separate coupling member, and a steering apparatus including the same.

In addition, the present invention is directed to providing a torque sensor capable of reducing a size of a product while a high current of an electronic control unit of a vehicle is avoided, and a steering apparatus including the same.

Objectives to be solved by embodiments are not limited to the above-described objectives and will include objectives and effects which can be identified by solutions for the objectives and the embodiments described below.

Technical Solution

One aspect of the present invention provides a torque sensor comprising, a rotor, a stator disposed outside the rotor, a sensor assembly configured to measure a magnetic field generated between the rotor and the stator; and a housing, the rotor and the stator are disposed outside the housing, the sensor assembly is disposed inside the housing, wherein the housing includes a protrusion which faces the stator, wherein the stator includes a groove, wherein the protrusion is disposed in the groove.

The housing may include a front surface which faces the stator and the front surface includes a curved surface portion, and the protrusion protrudes from the curved surface.

The collector may include an upper collector and a lower collector, and the the protrusion is disposed between the upper collector and the lower collector in the direction of an axis of the rotor.

The stator may include a mold member and a stator tooth fixed to the mold member and the groove is disposed in the mold member.

Another aspect of the present invention provides a torque sensor comprising, a rotor, a stator disposed outside the rotor, a sensor assembly configured to measure a magnetic field generated between the rotor and the stator, and a housing, wherein the rotor and the stator are disposed outside the housing, the sensor assembly is disposed inside the housing and includes an alignment means configured to align a position of the housing with a position of the stator in a direction of an axis of the rotor, wherein the housing includes a slot into which a substrate of the sensor assembly is inserted, wherein the substrate configured to be hooked an inner wall of the slot, wherein the substrate includes a stopper contacting an inlet of the slot.

The slot may include first hook portions disposed on an inner wall of the slot.

The housing may include second hook portions disposed on both side surfaces of the substrate to be hooked on the first hook portions in a direction in which the substrate is inserted thereinto.

The first hook portion may include a stepped portion: and the second hook portion includes a protrusion configured to be hooked on the stepped portion.

Yet another aspect of the present invention provides a torque sensor comprising, a rotor, a stator disposed outside the rotor and a sensor assembly configured to measure a magnetic field generated between the rotor and the stator, wherein the sensor assembly includes a housing, the rotor and the stator are disposed outside the housing, the housing includes a collector and a back yoke, the rotor and the stator are disposed in front of the collector, and the back yoke is disposed behind the collector, wherein the housing includes a slot into which a substrate of the sensor assembly is inserted, which the back yoke includes a first hole which is disposed to be aligned with the slot.

The housing may include guides which are disposed at both sides of the inlet of the slot and into which the substrate is inserted, wherein the back yoke includes a second hole through which the guides pass.

The housing may include a back yoke accommodation portion which is concavely disposed in the rear surface and accommodates the back yoke.

The housing includes a front surface which faces the stator, a rear surface positioned opposite the front surface, wherein the slot passes through the front surface from the rear surface.

Advantageous Effects

According to an embodiment, since an alignment position is secured between a stator tooth and a collector using an alignment means which is configured to align a position of a housing with a position of a stator, an advantageous effect of improving torque performance is provided.

Since a substrate is configured to be installed by being inserted into a slot and the substrate is inserted into the slot without a separate coupling member, advantageous effects of simplifying a manufacturing process and reducing a manufacturing cost are provided.

When the substrate is assembled in the housing, since the coupling member is not used, an advantageous effect of removing a manufacturing defect, which can occur in a coupling process, is provided.

Since a high current of an electronic control unit is blocked by a back yoke, a gap between the sensor assembly and the electronic control unit is decreased, and thus an advantageous effect of reducing an overall size of a product is provided.

Since a wire harness configured to connect the sensor assembly and the electronic control unit is removed, an advantageous effect of reducing a manufacturing cost is provided.

DESCRIPTION OF DRAWINGS

FIG. 1 is a view illustrating a torque sensor according to an embodiment.

FIG. 2 is an exploded view illustrating the torque sensor illustrated in FIG. 1.

FIG. 3 is a view illustrating a housing.

FIG. 4 is a view illustrating a curved surface portion disposed on a front surface of the housing.

FIG. 5 is a view illustrating the housing including a protrusion of an alignment means.

FIG. 6 is a view illustrating a stator including a groove of the alignment means.

FIG. 7 is a view illustrating a position at which the stator is aligned with a collector.

FIG. 8 is a view illustrating a state in which a protrusion of the housing is coupled to a groove of the stator.

FIG. 9 is a front view illustrating the housing seen from the front.

FIG. 10 is a view illustrating a substrate.

FIG. 11 is a view illustrating an interior of a slot of the housing.

FIG. 12 is a plan view illustrating the housing into which the substrate is inserted.

FIG. 13 is a view illustrating a torque sensor being coupled to an electronic control unit.

FIG. 14 is a view illustrating the housing and a back yoke.

FIG. 15 is a plan view illustrating the back yoke illustrated in FIG. 14.

FIG. 16 is an enlarged view illustrating a region A of FIG. 14.

FIG. 17 is a side cross-sectional view illustrating the torque sensor illustrated in FIG. 1.

FIG. 18 is a comparative view of a magnetic flux density of the collector of a sensor assembly in which the back yoke is disposed and a magnetic flux density of the collector of the sensor assembly in which the back yoke is not disposed.

MODES OF THE INVENTION

Hereinafter, exemplary embodiments of the present invention will be described in detail with reference to the accompanying drawings. Purposes, specific advantages, and novel features of the invention will be made clear from the exemplary embodiments and the following detailed description in connection with the accompanying drawings. In the description of the invention, when it is determined that detailed descriptions of related well-known functions unnecessarily obscure the gist of the invention, the detailed descriptions thereof will be omitted.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

FIG. 1 is a view illustrating a torque sensor according to an embodiment, and FIG. 2 is an exploded view illustrating the torque sensor illustrated in FIG. 1.

Referring to FIGS. 1 and 2, a torque sensor 10 may include a rotor 100, a stator 200, a sensor assembly 300, and a housing 400.

The rotor 100 is disposed inside the stator 20. The rotor 100 is connected to an input shaft of a steering shaft. Here, the input shaft may be a steering shaft connected to a handle of a vehicle. The rotor 100 may include a yoke 110 having a cylindrical shape and a magnet 120 disposed around the yoke 110. The input shaft is inserted into the yoke 110. In addition, the magnet 120 may be disposed outside the yoke 110. The magnet 120 may be fixed to an outer circumferential surface of the yoke 110 by being adhered or press-fitted thereto.

The stator 200 is disposed outside the rotor 100. The stator 200 may include stator teeth 210 having an annular shape, a mold member 220, and a holder 230. The pair of stator teeth 210 facing each other, may be disposed to be spaced apart from each other. In addition, two stator teeth 210 may be fixed to an upper side and a lower side of the mold member 220. The holder 230 is coupled to the mold member 220. The holder 230 may be connected to an output shaft of the steering shaft. Here, the output shaft may be a steering shaft connected to a power transmission system of a side of a wheel. Accordingly, the stator 200 is connected to the output shaft to rotate with the output shaft.

The sensor assembly 300 measures a magnetic field generated between the rotor 100 and the stator 200. The sensor assembly 300 is connected to an electronic control unit (ECU) of a motor, which assists steering, calculates torque on the basis of a measured magnetic field, and transmits the torque to the ECU.

The sensor assembly 300 may include a collector 310 and a substrate 320 including a sensor 321.

The collector 310 collects a flux of the stator 200. The collector 310 may include an upper collector 311 and a lower collector 312. The upper collector 311 and the lower collector 312 may be disposed to be spaced apart from each other in a direction of an axis of the rotor 100.

The substrate 320 includes the sensor 321. The sensor 321 may be a Hall integrated circuit (IC) which detects a change in a magnetic field. The sensor 321 detects an amount of magnetization of the stator 200 generated due to an electrical interaction between the magnet 120 of the rotor 100 and the stator 200. The sensor 321 is disposed between the upper collector 311 and the lower collector 312 in the direction of the axis of the rotor 100. The substrate 320 includes a connector 322. The connector 322 is connected to an ECU.

FIG. 3 is a view illustrating a housing.

Referring to FIGS. 2 and 3, the housing 400 fixes the collector 310 and the substrate 320. In addition, the housing 400 is disposed outside the rotor 100 and the stator 200. The housing 400 may be disposed in a housing (not shown) of the ECU. The housing 400 may include a slot 410 into which the substrate 320 is inserted. The slot 410 is disposed to pass through a front surface 400A and a rear surface 400B of the housing 400.

The front surface 400A of the housing 400 may denote a surface which faces the stator 200 when the housing 400 is disposed in the housing the ECU, the rear surface 400B of the housing 400 is positioned in a direction opposite the front surface 400A, and an inlet of the slot 410 into which the substrate 320 is inserted is positioned in the rear surface 400B. Guides 411 may be disposed at both sides of the inlet of the slot 410. Both edges of the substrate 320 are inserted into the guides 411. The substrate 320 is inserted into the slot 410 along the guides 411. In a state in which the substrate 320 is inserted into the slot 410, the connector 322 is positioned outside the housing 400. A plurality of coupling portions 412 which are coupled to the housing of the ECU may be provided in the housing 400.

FIG. 4 is a view illustrating a curved surface portion disposed on a front surface of the housing.

Referring to FIGS. 3 and 4, the front surface 400A of the housing 400 may include a curved surface portion 420 and flat surface portions 430. A radius R1 of a curvature of the curved surface portion 420 may be at least greater than a radius R2 of a curvature of the stator teeth 210. The flat surface portions 430 are disposed at both sides of the curved surface portion 420. A plurality of coupling protrusions 440 may be disposed on the flat surface portions 430. The coupling protrusions 440 are coupled to the collector 310.

FIG. 5 is a view illustrating the housing including a protrusion of an alignment means, FIG. 6 is a view illustrating a stator including a groove of the alignment means, and FIG. 7 is a view illustrating a position at which the stator is aligned with a collector.

Referring to FIGS. 5 to 7, an alignment means serves to align a position of the stator teeth 210 with a position of the collector 310 in the direction of the axis of the rotor 100. Since the stator 200 including the stator teeth 210 is connected to the steering shaft and the housing 400 including the collector 310 is connected to the housing of the ECU, there is a high risk in that an error in alignment occurs between the position of the stator teeth 210 and the position of the collector 310. The alignment means physically connects the stator 200 and the housing 400 to reduce the error in alignment.

The alignment means includes a protrusion 450 disposed on the housing 400 and a groove 221 provided in the mold member 220 of the stator 200.

The protrusion 450 is disposed on the front surface 400A of the housing 400. Specifically, the protrusion 450 may be disposed on the curved surface portion 420 of the housing 400. The protrusion 450 may be disposed between the upper collector 311 and the lower collector 312 in the direction of the axis of the rotor 100. In addition, a front surface 451 of the protrusion 450 may be formed to have a curved surface.

The groove 221 is disposed along an outer circumferential surface of the mold member 220. The groove 221 is concavely formed in the outer circumferential surface of the mold member 220. In addition, an overall shape of the groove 221 may be an annular shape.

When the groove 221 is aligned with the protrusion 450 in the direction of the axis of the rotor 100, the stator teeth 210 are aligned with the collector 310.

FIG. 8 is a view illustrating a state in which a protrusion of the housing is coupled to a groove of the stator.

Referring to FIG. 8, when the groove 221 and the protrusion 450 are coupled, the stator teeth 210 are aligned with the collector 310 in the direction of the axis of the rotor 100. Accordingly, in the torque sensor in which the stator 200 and the sensor assembly 300 are individually disposed, the torque sensor according to the embodiment can have an advantage of improving torque performance.

FIG. 9 is a front view illustrating the housing seen from the front.

Referring to FIG. 9, the slot 410 may be disposed between the upper collector 311 and the lower collector 312 in the direction of the axis of the rotor 100. Accordingly, the substrate 320 inserted into the slot 410 may also be disposed between the upper collector 311 and the lower collector 312.

FIG. 10 is a view illustrating a substrate.

Referring to FIG. 10, the substrate 320 may include second hook portions 323. The second hook portions 323 serve to fix the substrate 320 to the slot 410 so that the substrate 320 is not withdrawn from the slot 410 in a state in which the substrate 320 is inserted into the slot 410.

The second hook portions 323 may be disposed at both side surfaces of the substrate 320. The second hook portions 323 may be protrusions which protrude from the both side surfaces of the substrate 320. The second hook portions 323 may be disposed in a front of the substrate 320. The sensor 321 is disposed in the front of the substrate 320. A protrusion of the second hook portion 323 may include an inclined surface which is inclined in a rear direction, and an end portion thereof may be formed to have a stepped portion. When the substrate 320 is inserted into the slot 410, the second hook portions 323 are hooked on first hook portions 413 while moving along an inner wall of the slot 410.

The substrate 320 may include stoppers 324. When the substrate 320 is inserted into the slot 410, the stopper 324 serves to prevent the substrate 320 from being inserted into the slot 410 beyond an original position.

The stopper 324 may be disposed in a rear of the substrate 320. The connector 322 is disposed in the rear of the substrate 320. The stoppers 324 are disposed on the both side surfaces of the substrate 320 to have stepped portions. When the substrate 320 is inserted into the slot 410, the stoppers 324 come into contact with ends of guides 411 to prevent the substrate 320 from being inserted into the slot 410 more than necessary.

FIG. 11 is a view illustrating an interior of a slot of the housing.

Referring to FIG. 11, the first hook portion 413 is disposed on the inner wall of the slot 410. The first hook portion 413 includes a stepped portion.

When the substrate 320 is inserted into the slot 410, the second hook portions 323 are hooked on the first hook portions 413 having a stepped shape. Accordingly, when the substrate 320 is about to be withdrawn from the slot 410, the second hook portions 323 of the substrate 320 are hooked on the first hook portions 413 of the slot 410 so that the substrate 320 is not withdrawn from the slot 410.

In addition, when the substrate 320 is inserted into the slot 410 and the sensor 321 is aligned with a target position, the stoppers 324 of the substrate 320 are hooked on the ends of the guides 411 so that the substrate 320 is prevented from being excessively inserted into the slot 410.

FIG. 12 is a plan view illustrating the housing into which the substrate is inserted.

Referring to FIGS. 11 and 12, in a state in which the substrate 320 is inserted into the slot 410, the connector 322 is positioned outside the housing 400. When the substrate 320 is inserted into the slot 410, a space in which the connector 322 is disposed is secured due to the guides 411 which protrude from the inlet of the slot 410. The connector 322 may be coupled to a connector of an ECU of the vehicle. Accordingly, in a state in which the substrate 320 is inserted into the slot 410, the substrate 320 is primarily fixed by the first hook portions 413 and the second hook portions 323 and secondarily fixed by the connector 322 being coupled to the connector of the ECU of the vehicle so that the substrate 320 can be stably fixed without a separate coupling member.

FIG. 13 is a view illustrating a torque sensor being coupled to an ECU.

Referring to FIG. 13, the torque sensor 10 may be connected adjacent to an ECU 20. Here, a high current generated by the ECU 20 may affect the torque sensor 10.

FIG. 14 is a view illustrating the housing and a back yoke.

Referring to FIG. 2 and FIG. 14, the housing 400 may include the back yoke. The back yoke 460 serves to block a high current of the ECU 20 from being induced into the sensor assembly 300. When the stator 200 is disposed in front of the collector 310, the back yoke 460 may be disposed behind the collector 310. This is to prevent the high current of the ECU 20 from affecting the collector 310.

For example, the back yoke 460 may be disposed on the rear surface 400B of the housing 400. A back yoke accommodation portion 470 may be provided in the rear surface 400B of the housing 400. The back yoke accommodation portion 470 may be concavely disposed in the rear surface 400B of the housing 400. The back yoke 460 is seated on the back yoke accommodation portion 470. The back yoke 460 may have a quadrilateral plate shape, but the present invention is not limited thereto and may be variously modified by considering a shape of the rear surface 400B of the housing 400.

The back yoke 460 may include a first hole 461 through which the substrate 320 passes. The first hole 461 has an elongated shape which is laterally disposed. When the back yoke 460 is installed in the back yoke accommodation portion 470, the first hole 461 is aligned with the slot 410. In addition, the back yoke 460 may include second holes 462 through which the guides 411 pass. The second hole 462 has an elongated shape which is vertically disposed by considering the shape of the guide 411. The first hole 461 may be connected to the second holes 462.

FIG. 15 is a plan view illustrating the back yoke illustrated in FIG. 14.

Referring to FIGS. 14 and 15, the back yoke 460 may include a main plate 460A including the first hole 461 and the second holes 462 and side plates 460B disposed to be bent from both sides of the main plate 460A. The side plates 460B may include protrusions 463.

FIG. 16 is an enlarged view illustrating a region A of FIG. 14.

Referring to FIGS. 14 and 16, groove portions 471 may be provided in both side walls of the back yoke accommodation portion 470. The protrusion 463 of the back yoke 460 is inserted into the groove portion 471. The groove portions 471 and the protrusions 463 prevent the back yoke 460 from being withdrawn from the back yoke accommodation portion 470.

FIG. 17 is a side cross-sectional view illustrating the torque sensor illustrated in FIG. 1.

As illustrated in FIG. 17B, the upper collector 311 and the lower collector 312 are disposed with the sensor 321 therebetween. When a high current is introduced into the ECU 20 (see FIG. 3), a change in magnetic flux occurs at a portion of the collector 310 which faces the sensor 321. When the change in magnetic flux occurs due to disturbance at the portion of the collector 310, a critical problem occurs that torque may not be measured accurately. The back yoke 460 disposed behind the collector 310 blocks a high current introduced from the ECU 20 (see FIG. 3) so as to prevent the change in magnetic flux occurring due to disturbance at the portion of the collector 310.

FIG. 18 is a comparative view of a magnetic flux density of the collector of a sensor assembly in which the back yoke is disposed and a magnetic flux density of the collector of the sensor assembly in which the back yoke is not included.

FIG. 18A shows a magnetic flux density of the collector 310 of the sensor assembly 300 in which the back yoke is not disposed, and the measured magnetic flux density thereof is 0.2987 mT. FIG. 18B shows a magnetic flux density of the collector of the sensor assembly in a state in which the back yoke 460 is disposed, and the measured magnetic flux density is 0.2078 mT.

It may be seen that the magnetic flux density of the collector 310 of the sensor assembly 300 which does not include the back yoke is relatively high. This is because the magnetic flux density is affected by a high current introduced from the ECU 20 (see FIG. 13). However, in a state in which the back yoke 460 is disposed therein, since the back yoke 460 blocks a high current introduced due to disturbance, it may be seen that a normal magnetic flux density is measured.

As described above, the torque sensor and the steering apparatus including the same according to one exemplary embodiment of the present invention have been specifically described with reference to the accompanying drawings.

The above-described embodiments of the present invention should be understood in a descriptive sense only and not for purposes of limitation. The scope of the present invention is defined not by the above-described detailed description but by the appended claims which will be described below. In addition, it should be interpreted that the scope of the present invention encompasses all modifications and alterations derived from meanings, the scope, and equivalents of the appended claims.

The invention claimed is:

1. A torque sensor comprising:
a rotor;
a stator disposed outside the rotor;
a sensor assembly configured to measure a magnetic field generated between the rotor and the stator; and
a housing;
the rotor and the stator are disposed outside the housing,
the sensor assembly is disposed inside the housing,
wherein the housing includes a protrusion which faces the stator,
wherein the stator includes a groove,
wherein the protrusion is disposed in the groove.

2. The torque sensor of claim 1, wherein the housing includes a front surface which faces the stator and the front surface includes a curved surface portion, and the protrusion protrudes from the curved surface.

3. The torque sensor of claim 2, wherein:
the stator includes a mold member and a stator tooth fixed to the mold member; and
the groove is disposed in the mold member.

4. The torque sensor of claim 1, wherein the collector includes an upper collector and a lower collector, and the protrusion is disposed between the upper collector and the lower collector in the direction of an axis of the rotor.

5. A torque sensor comprising:
a rotor,
a stator disposed outside the rotor,
a sensor assembly configured to measure a magnetic field generated between the rotor and the stator, and
wherein the sensor assembly includes a housing,
wherein the rotor and the stator are disposed outside the housing,
the sensor assembly is disposed inside the housing and includes an alignment means configured to align a position of the housing with a position of the stator in a direction of an axis of the rotor,
wherein the housing includes a slot into which a substrate of the sensor assembly is inserted,
wherein the substrate configured to be hooked an inner wall of the slot,
wherein the substrate includes a stopper contacting an inlet of the slot.

6. The torque sensor of claim 5, wherein the slot includes first hook portions disposed on an inner wall of the slot.

7. The torque sensor of claim 5, wherein the housing includes second hook portions disposed on both side surfaces of the substrate to be hooked on the first hook portions in a direction in which the substrate is inserted thereinto.

8. The torque sensor of claim 7, wherein:
the first hook portion includes a stepped portion; and
the second hook portion includes a protrusion configured to be hooked on the stepped portion.

9. A torque sensor comprising:
a rotor;
a stator disposed outside the rotor; and
a sensor assembly configured to measure a magnetic field generated between the rotor and the stator,
wherein the sensor assembly includes a housing,
the rotor and the stator are disposed outside the housing,
the housing includes a collector and a back yoke,
the rotor and the stator are disposed in front of the collector, and
the back yoke is disposed behind the collector,
wherein the housing includes a slot into which a substrate of the sensor assembly is inserted,
which the back yoke includes a first hole which is disposed to be aligned with the slot.

10. The torque sensor of claim 9,
wherein the housing includes guides which are disposed at both sides of the inlet of the slot and into which the substrate is inserted,
wherein the back yoke includes a second hole through which the guides pass.

11. The torque sensor of claim 9,
wherein the housing includes a back yoke accommodation portion which is concavely disposed in the rear surface and accommodates the back yoke.

12. The torque sensor of claim 9,
wherein the housing includes:
a front surface which faces the stator;
a rear surface positioned opposite the front surface;
wherein the slot passes through the front surface from the rear surface.

* * * * *